United States Patent
Chun et al.

(10) Patent No.: US 9,008,243 B2
(45) Date of Patent: Apr. 14, 2015

(54) METHOD AND APPARATUS FOR CORRECTING A REFERENCE CLOCK OF A GPS RECEIVER

(75) Inventors: Anthony L. Chun, Los Altos, CA (US); Yi Lin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/996,974

(22) PCT Filed: Jun. 8, 2012

(86) PCT No.: PCT/US2012/041712
§ 371 (c)(1), (2), (4) Date: Mar. 11, 2014

(87) PCT Pub. No.: WO2013/184144
PCT Pub. Date: Dec. 12, 2013

(65) Prior Publication Data
US 2014/0185655 A1   Jul. 3, 2014

(51) Int. Cl.
| H04L 27/06 | (2006.01) |
| H04B 1/7073 | (2011.01) |
| G01S 19/23 | (2010.01) |
| H04B 1/709 | (2011.01) |

(52) U.S. Cl.
CPC .............. *H04B 1/7073* (2013.01); *G01S 19/23* (2013.01); *H04B 1/709* (2013.01)

(58) Field of Classification Search
None
See application file for complete search history.

(56) References Cited

U.S. PATENT DOCUMENTS

| 2003/0197638 A1 | 10/2003 | Bloebaum et al. |
| 2005/0024263 A1 | 2/2005 | Sharpe et al. |
| 2006/0064725 A1* | 3/2006 | Rabinowitz et al. ............ 725/68 |
| 2008/0158050 A1 | 7/2008 | Levy |
| 2009/0109088 A1 | 4/2009 | Bryant et al. |
| 2010/0207814 A1 | 8/2010 | Cho |
| 2011/0068979 A1* | 3/2011 | Waters et al. ............ 342/357.65 |
| 2012/0133554 A1* | 5/2012 | Bromley et al. ......... 342/357.25 |

FOREIGN PATENT DOCUMENTS

WO   2013/184144 A1   12/2013

OTHER PUBLICATIONS

International Search Report and Written Opinion received for PCT Patent Application No. PCT/US2012/041712, mailed on Jan. 29, 2013, 9 pages.

* cited by examiner

*Primary Examiner* — Adolf Dsouza
(74) *Attorney, Agent, or Firm* — Ellis B. Ramirez; Prass LLP (57) ABSTRACT

An approach is provided for correcting a reference clock of a GPS receiver. The approach involves determining one or more frequency offset values. The approach also involves determining one or more codes associated with one or more satellites. The approach further involves determining a second code associated with the one or more satellites. The approach additionally involves determining one or more delay values between the second code and the one or more first codes. The approach also involves determining one or more proportional values based on the one or more delay values and a determined correlation. The approach further involves determining one or more correlation peak values and determining one or more estimated frequency offset error values based on the one or more correlation peak values. The approach additionally involves causing a calibrated reference clock frequency value to change to a recalibrated reference clock frequency value based on the estimated frequency offset error values.

20 Claims, 6 Drawing Sheets

METHOD AND APPARATUS FOR CORRECTING A REFERENCE CLOCK OF A GPS RECEIVER

BACKGROUND

Service providers and device manufacturers (e.g., wireless, cellular, etc.) are continually challenged to deliver value and convenience to consumers by, for example, providing compelling network services. GPS receivers often acquire and track a carrier signal under weak signal conditions using a temperature-compensated clock. To meet stringent reference clock accuracy requirements across a wide temperature range, discrete clock references such as temperature-compensated crystal oscillators or voltage-controlled temperature-compensated crystal oscillators, are commonly used. However, such discrete solutions for acquiring and maintaining an accurate GPS signal acquisition are very costly.

SOME EXAMPLE EMBODIMENTS

Therefore, there is a need to improve initial frequency accuracy of a low cost temperature compensated clock by performing a coarse estimation of frequency offset and dynamic clock frequency correction during a GPS acquisition period.

According to one embodiment, a method comprises determining one or more frequency offset values. The method also comprises determining one or more first codes associated with one or more satellites. The method further comprises determining a same second code associated with the one or more satellites. The method additionally comprises determining one or more delay values between the same second code and the one or more first codes. The method also comprises determining one or more proportional values based, at least in part, on the one or more delay values and a determined correlation between the one or more frequency offset values and the same second code.

The method further comprises determining one or more correlation peak values based, at least in part, on the one or more respective proportional values and the one or more delay values. The method additionally comprises determining one or more estimated frequency offset error values based, at least in part, on the one or more correlation peak values. The method also comprises causing, at least in part, a calibrated reference clock frequency value to be changed to a recalibrated reference clock frequency value based, at least in part, on the one or more estimated frequency offset error values.

According to another embodiment, an apparatus comprises at least one processor, and at least one memory including computer program code for one or more computer programs, the at least one memory and the computer program code configured to, with the at least one processor, cause, at least in part, the apparatus to determine one or more frequency offset values. The apparatus is also caused to determine one or more first codes associated with one or more satellites. The apparatus is further caused to determine a same second code associated with the one or more satellites. The apparatus is additionally caused to determine one or more delay values between the same second code and the one or more first codes. The apparatus is also caused to determine one or more proportional values based, at least in part, on the one or more delay values and a determined correlation between the one or more frequency offset values and the same second code.

The apparatus is further caused to determine one or more correlation peak values based, at least in part, on the one or more respective proportional values and the one or more delay values. The apparatus is additionally caused to determine one or more estimated frequency offset error values based, at least in part, on the one or more correlation peak values. The apparatus is further caused to cause, at least in part, a calibrated reference clock frequency value to be changed to a recalibrated reference clock frequency value based, at least in part, on the one or more estimated frequency offset error values.

According to another embodiment, a computer-readable storage medium carries one or more sequences of one or more instructions which, when executed by one or more processors, cause, at least in part, an apparatus to determine one or more frequency offset values. The apparatus is also caused to determine one or more first codes associated with one or more satellites. The apparatus is further caused to determine a same second code associated with the one or more satellites. The apparatus is additionally caused to determine one or more delay values between the same second code and the one or more first codes. The apparatus is also caused to determine one or more proportional values based, at least in part, on the one or more delay values and a determined correlation between the one or more frequency offset values and the same second code.

The apparatus is further caused to determine one or more correlation peak values based, at least in part, on the one or more respective proportional values and the one or more delay values. The apparatus is additionally caused to determine one or more estimated frequency offset error values based, at least in part, on the one or more correlation peak values. The apparatus is further caused to cause, at least in part, a calibrated reference clock frequency value to be changed to a recalibrated reference clock frequency value based, at least in part, on the one or more estimated frequency offset error values.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments are illustrated by way of example, and not by way of limitation, in the figures of the accompanying drawings.

DESCRIPTION OF SOME EMBODIMENTS

Examples of a method, apparatus, and computer program for correcting a reference clock by performing a coarse estimation of frequency offset during a GPS acquisition period are disclosed. In the following description, for the purposes of explanation, numerous specific details are set forth in order to provide a thorough understanding of the embodiments. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

Figure 1:
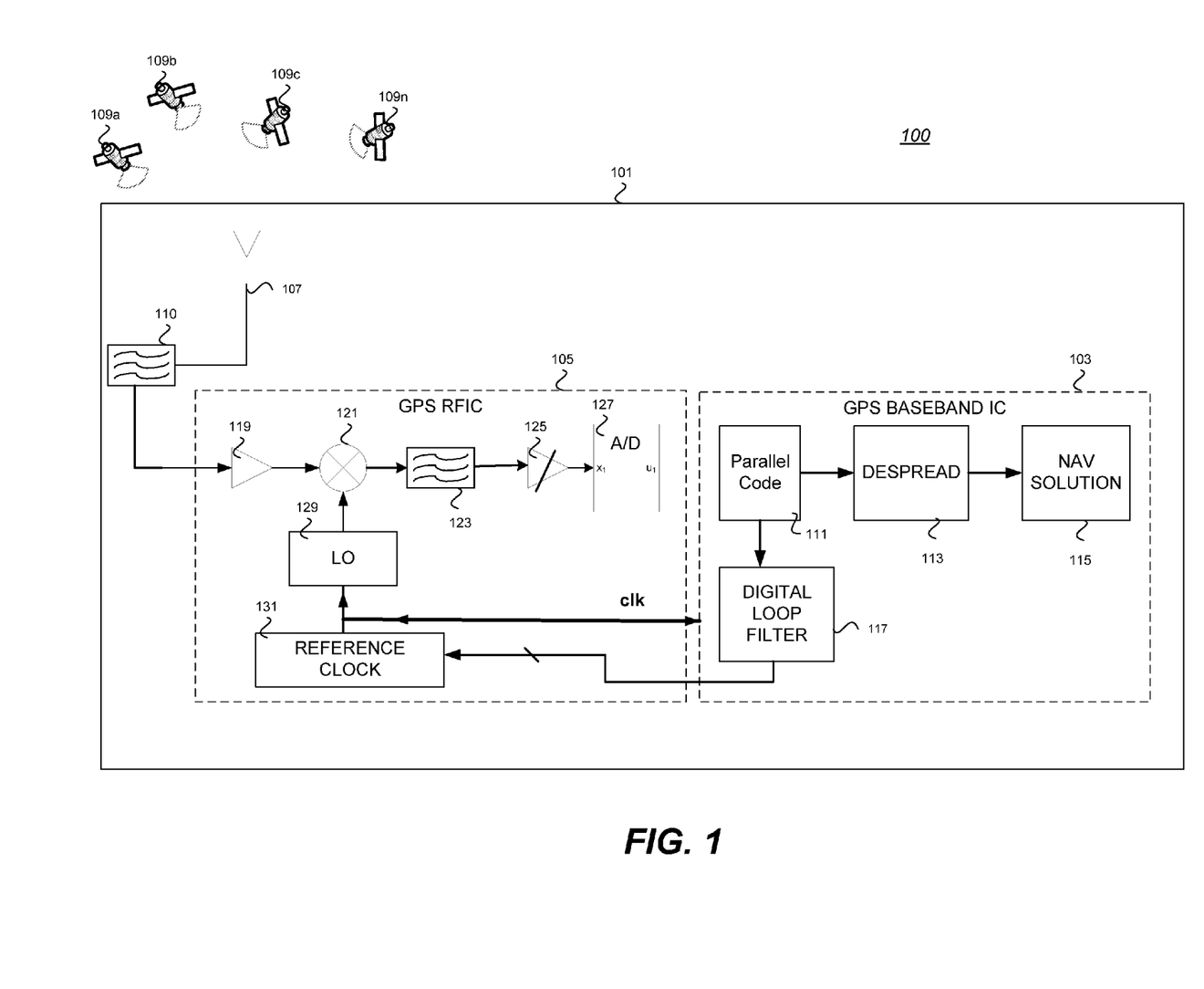
FIG. 1 is a diagram of a system capable of correcting a reference clock by performing a coarse estimation of frequency offset during a GPS acquisition period, according to one embodiment.

FIG. 1 is a diagram of a system capable of correcting a reference clock by performing a coarse estimation of frequency offset during a GPS acquisition period, according to one embodiment.

Location information is important for a host of services that are offered or planned to be offered by various user devices such as smartphones, tablets and other wireless devices. Location information is often obtained for these services by way of several wireless services such as, for example, the satellite-based Global Positioning System (GPS) in the United States, and similar systems in Europe (e.g., Galileo), China (e.g. Beidou GPS), Russia (e.g., Glonass), and the like such as any other current or future developed positioning systems. For a GPS receiver to acquire and track a signal under weak signal conditions, a very high accuracy (e.g., +/−0.5 ppm (parts per million) from −40~85° C.) temperature-compensated clock is typically required to be incorporated into a user device, or at least accessible by the user device. However, such temperature-compensated clocks are often very expensive.

As such, the addition of a conventional high accuracy temperature-compensated clock to a user device often adds a significant cost to the bill of materials of a multiple-communication platform device such as a smartphone, mobile internet device, tablet, and the like. Additionally, for a GPS receiver to acquire and track a signal, traditional temperature-compensated oscillators often require a calibration process that requires many temperature points.

One alternative to the use of a conventional temperature-compensated clock is a low cost integrated solution that uses an in-field GPS system-assisted calibration scheme to constantly improve Look Up Table (LUT) frequency control accuracy. However, this alternative usually requires an initial clock frequency offset that is less than 3 ppm across a wide temperature range under outdoor conditions. To meet this requirement, a complex statistical system-assist calibration is necessary that is often time consuming and burdensome on system resources.

To address this problem, a system 100 of FIG. 1 introduces the capability to correct a reference clock by performing a coarse estimation of frequency offset during a GPS acquisition period. The system 100 simplifies the system-assist calibration scheme by way of a digital signal processing engine and algorithm that performs a coarse estimation of frequency offset and a dynamic frequency correction during the GPS acquisition period. Such an approach uses a low cost integrated temperature-compensated reference clock rather than the conventional high cost, high accuracy, temperature-compensated clock discussed above.

According to various embodiments, as will be discussed in more detail below, the system 100 re-uses multiple reconfigurable parallel code detector blocks to compute a navigation solution based on signals from multiple satellites. The system 100 also uses multiple frequency mixers for a single GPS satellite in order to correct frequency offset. Further, the system 100 generates a frequency control signal that can be used to tune a local reference clock frequency or value associated with a user device in lieu of the conventional temperature-compensated clock. The resulting approach involves a multi-channel GPS receiver with a control circuit and a feedback loop in communication with a local oscillator to correct a reference clock without a conventional high cost, high accuracy, temperature-compensated clock such as that discussed above.

One of the challenges of using a GPS signal to accurately estimate the carrier offset is that signal strength is inherently weak under actual operating conditions. For example, signal strength can be attenuated when the GPS receiver is in an urban environment where buildings can interfere with signal strength. In addition, conventional initial clock frequency offset makes GPS "cold start" acquisition very difficult and requires a substantial amount of time. However, unlike traditional frequency offset estimation methods such as that discussed above, the system 100 is configured to enable a dynamic frequency offset coarse estimation and frequency correction that is less time consuming and less burdensome on system resources. The aforementioned reconfigurable parallel code detector blocks are robust estimators that work in parallel to reduce the overall processing time of a dynamic frequency offset coarse estimation. The system 100 also estimates any timing errors without computing a navigation solution to further reduce the amount of time required to estimate the frequency offset.

As shown in FIG. 1, the system 100 comprises a user equipment (UE) 101 that comprises a GPS baseband integrated circuit (IC) 103, a GPS radio frequency integrated circuit (RFIC) 105, and a GPS antenna 107 having connectivity to one or more satellites 109a-109n (collectively referred to as satellite 109). The system 100 may also comprise a surface acoustic wave filter 110.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user such as "wearable" circuitry (e.g. glasses, head mounted, wrist-mounted, neck mounted, implant, necklace, watch, bracelet, etc.) or the UE 101 may be vehicle mounted as well.

According to various embodiments, the GPS baseband IC 103 includes a parallel code detector module 111, a despread module 113, a navigation solution determination module 115, and a digital loop filter 117. The (GPS RFIC 105 includes low noise amplifier 119, a mixer 121, a baseband filter 123, an amplifier 125 such as a variable gain amplifier, an analog to digital converter 127, a local oscillator 129, and a reference clock module 131. The parallel code detector module 111 generates an estimate of any frequency error of the reference clock module 131, and a digital control signal based on the estimated frequency error is fed back to the reference clock module 131 for frequency dynamic tuning.

Figure 2:
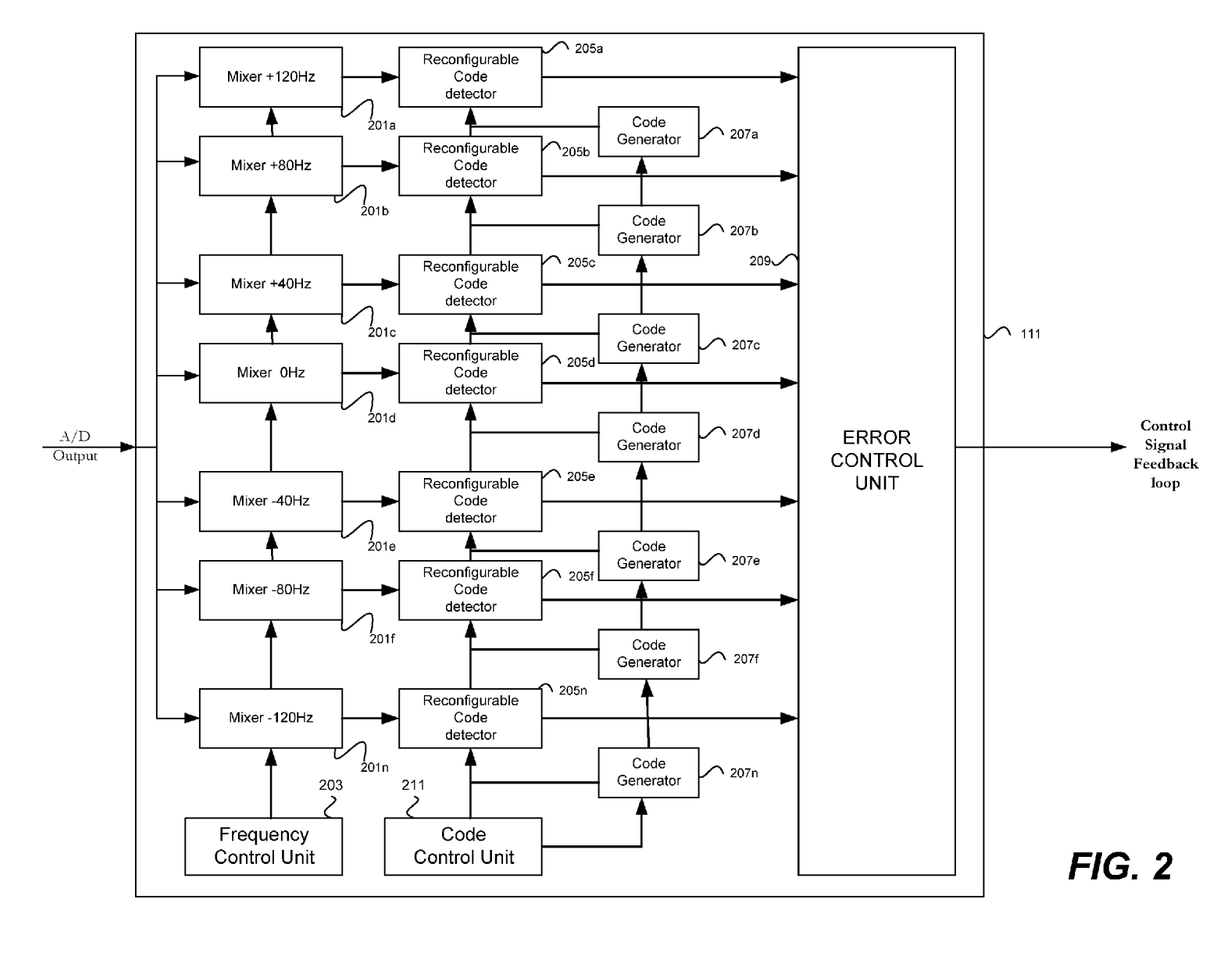
FIG. 2 is a diagram of the components of a reconfigurable parallel code detector module, according to one embodiment.

FIG. 2 is a diagram of the components of the parallel code detector module 111, discussed above, according to one embodiment. By way of example, the parallel code detector module 111 includes one or more components for correcting a reference clock by performing a coarse estimation of frequency offset during a (GPS acquisition period. It is contemplated that the functions of these components may be combined in one or more components or performed by other components of equivalent functionality. In this embodiment, the parallel code detector module 111 includes a set of N parallel programmable digital frequency mixers 201a-201n (collectively referred to as frequency mixer 201). The set of N frequency mixers 201 are each tuned to a multiple of a nominal programmable frequency offset value $\Delta f$. The frequency mixers 201 can cover a frequency range of N×$\Delta f$ and may be programmed by way of a frequency control unit 203. According to various embodiments, while this example illustrates a $\Delta f$ of 40, the $\Delta f$ values may be any frequency value and may or may not be spaced linearly (i.e. equally spaced) at a multiple of $\Delta f$. For example, FIG. 2 illustrates ±N$\Delta f$ where N=1, 2, 3 and $\Delta f$=40 Hz. This example, therefore, illustrates ±N$\Delta f$ values of −120 Hz, −80 Hz, −40 Hz, 0 Hz, +40 Hz, +80 Hz, and +120 Hz. But, it should be noted that the parallel code detector module may also distribute ±N$\Delta f$ values for any $\Delta f$ at any N. For example, the distribution may be such that N=1, 2, 3, and $\Delta f$ for N=1 is 10, N=2 is 30, and N=3 is 65. In this alternative example, ±N$\Delta f$ uses different $\Delta f$ values for each N frequency mixer 201, but the distribution is symmetrical, i.e. −130 Hz, −60 Hz, −10 Hz, 0 Hz, +10 Hz, +60 Hz, and +130 Hz.

In one or more embodiments, the parallel code detector module 111 also comprises a set of N parallel reconfigurable robust code detector blocks 205a-205n (collectively referred to as code detector block 205). The code detector blocks 205 include correlator and coherent and non-coherent averaging schemes to mitigate any effects of noise. Attached to each code detector block 205, and optionally individually in communication with the code control unit 211, is a respective programmable GPS code generator 207a-207n (collectively referred to as code generator 207).

The code generator 207 is reconfigurable to use the same code for one satellite 109 of the satellites 109a-109n, discussed above. Each code detector block 205 is configured to correlate a local copy of a satellite pseudorandom Gold code associated with a satellite 109 with a received frequency-mixed sample received by way of the analog digital converter 127, discussed above. In one or more embodiments, the code detector block 205 outputs a value proportional to how closely correlated the code is with the received samples. The parallel code detector module 111 determines a value of a correlation peak that is proportional to the carrier frequency offset of the frequency mixer 201 and a determined delay between the local code and the received code.

In one or more embodiments, the parallel code detector module 111 further includes an error control unit 209 that has control logic that takes the correlation outputs of the code detector blocks 205 and produces an estimate of the frequency offset error. The parallel code detector module 111 determines the behavior of each of the code detector blocks 205 as the local oscillator 129, discussed above, varies with the estimated frequency offset. The parallel code detector module 111 generates a control signal by taking the sum of the differences of the correlation peaks at ±N$\Delta f$ and causes frequency correction by feeding the estimated error signal back to recalibrate a calibrated reference clock frequency value of the reference clock module 131, discussed above with a recalibrated reference clock frequency value based on the estimated error signal.

In one or more embodiments, the frequency offsets produced by the digital mixers 201 are programmable to any value and are controlled via the frequency control unit 203. The estimated frequency error is computed using the error control unit 209 and is used to iteratively tune the local reference clock module 131 in the GPS RFIC 105.

In one or more embodiments, the process of estimating frequency offset may be continually conducted until the behavior of the reference clock module 131 is determined to be relatively stable based on a predetermined criteria. Once the reference clock module 131 is determined to be relatively stable, the code detector blocks 205 can be switched to process multiple satellites 109 in order to receive signals from multiple satellites 109 and compute a navigation solution.

In one or more embodiments, the initial code acquisition of the codes of satellites 109 visible to the UE 101 may be performed prior to determining a reference clock correction. In this example, the initial code acquisition can be done by using the code detector blocks 205 in a multi-satellite code mode or by using a GPS-assist by way of a cellular system that services the UE 101, for example. In one or more embodiments, each satellite 109 visible to the UE 101 may have the processes discussed performed such that a reference clock frequency value associated with each of the multiple satellites 109 may be corrected for each of the multiple satellites 109 and accordingly used to determine a navigation solution or position of the UE 101, for example, or only one or some of the satellites 109 may be processed for reference clock correction and a navigation solution may be computed based on at least one corrected reference clock frequency value and any pre-existing values associated with any satellites 109 that are not processed.

As such, according to various embodiments, the parallel code detector blocks 205 and the code generator 207 are reconfigurable by way of a code control unit 211 for either processing one satellite 109 to correct a reference clock frequency value or multiple satellites 109 to compute a navigation solution. Accordingly, any a additional hardware that is required beyond that which a traditional (GPS receiver unit requires is minimal, and the added costs of incorporating a temperature-compensated clock into a UE 101 is reduced.

Figure 3:
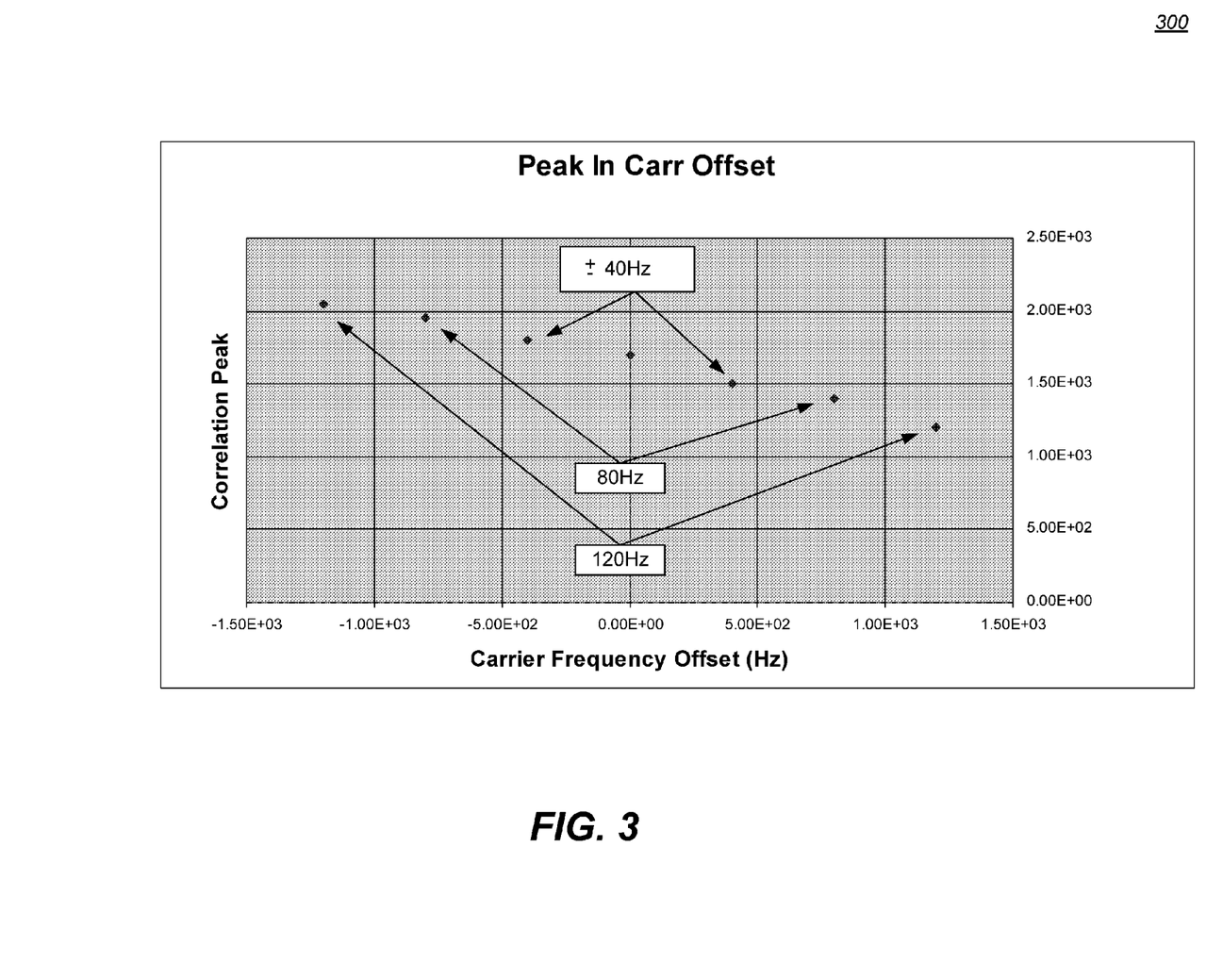
FIG. 3 is a chart illustrating various plots of correlation peaks for various carrier frequency offsets, according to one embodiment.

FIG. 3 is a graph 300 that illustrates the behavior of the parallel code detector module 111, discussed above. Specifically, the graph 300 illustrates the behavior of the control logic of the error control unit 209 by plotting the determined carrier frequency offset versus the behavior of each of the code detector blocks 205 as the local oscillator 129, discussed above, varies with frequency offset.

For example, the graph 300 illustrates determined correlation peak values for an N=3 number of parallel reconfigurable frequency mixers 201 and code detector blocks 205 by plotting the determined the carrier frequency offset for correlation peaks at ±N$\Delta f$. In this example, N=1, 2, 3 and $\Delta f$=40 Hz. Based on these determined values for respective correlation peak values, the error control unit 209 determines a control signal that is used to recalibrate the reference clock module 131, as discussed further in FIG. 4.

Figure 4:
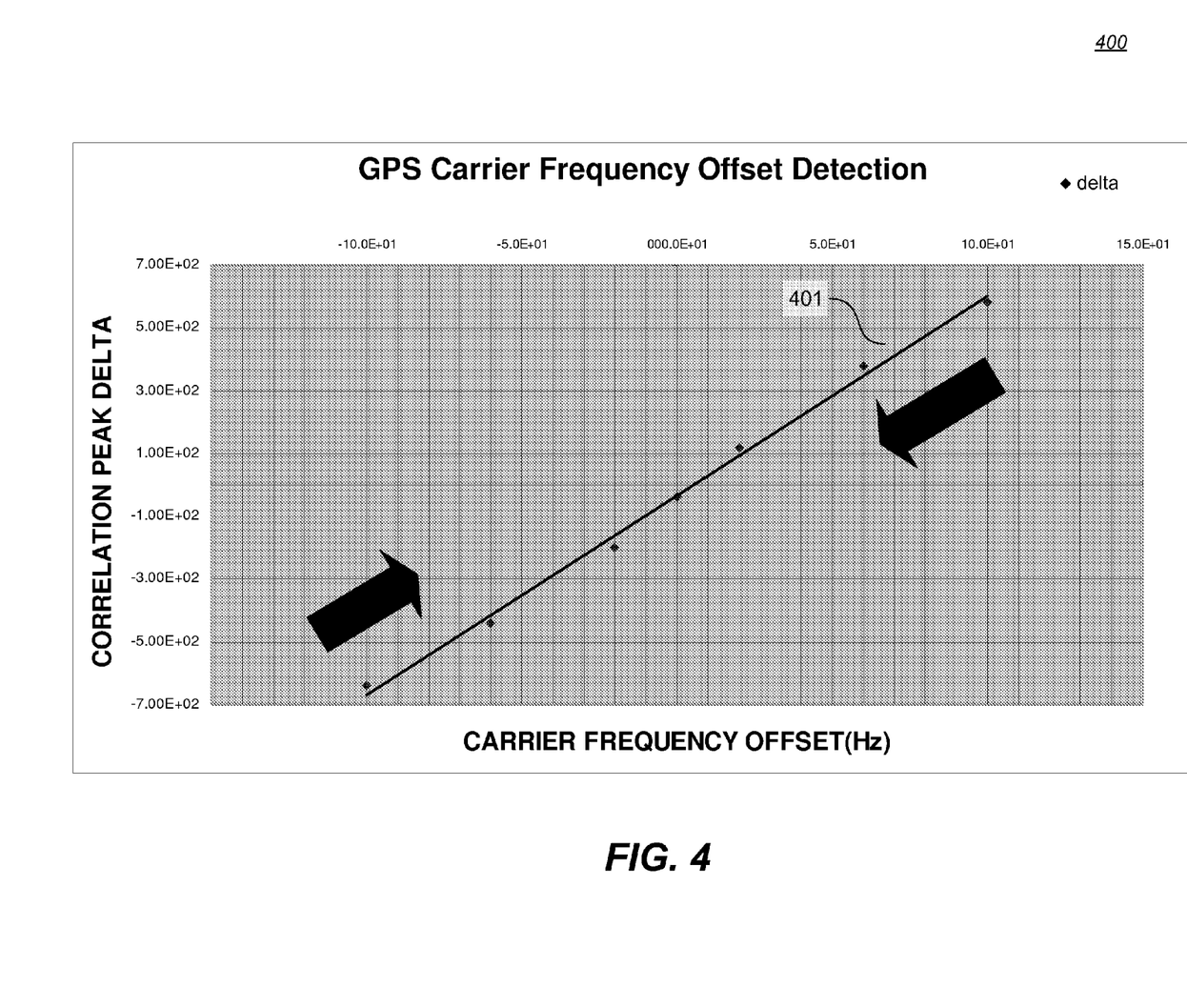
FIG. 4 is a chart illustrating determined correlation peak difference values for various absolute carrier frequency offset values, according to one embodiment.

FIG. 4 illustrates a graph 400 depicting a control signal 401 used to recalibrate the reference clock module 131. The parallel code detector module 111 generates the control signal 401 by taking the sum of the differences of the correlation peaks at ±N$\Delta f$ illustrated in FIG. 3. The change in correlation peak value is referred to as the correlation peak delta value and is plotted in FIG. 4 versus the determined carrier frequency offset.

For example, when N=3, and $\Delta f$=40 Hz, the differences of the correlation peak values are taken between N×$\Delta f$ values that are paired based on having an equal absolute value. For example, the differences between correlation peak values for each of ±40 Hz, ±80 Hz, and ±120 Hz are determined and illustrated in FIG. 4.

A high correlation peak delta value indicates that the reference clock should be decreased and a low correlation peak delta value indicates that the reference clock should be increased when the reference clock module 131 is recalibrated.

Figure 5:
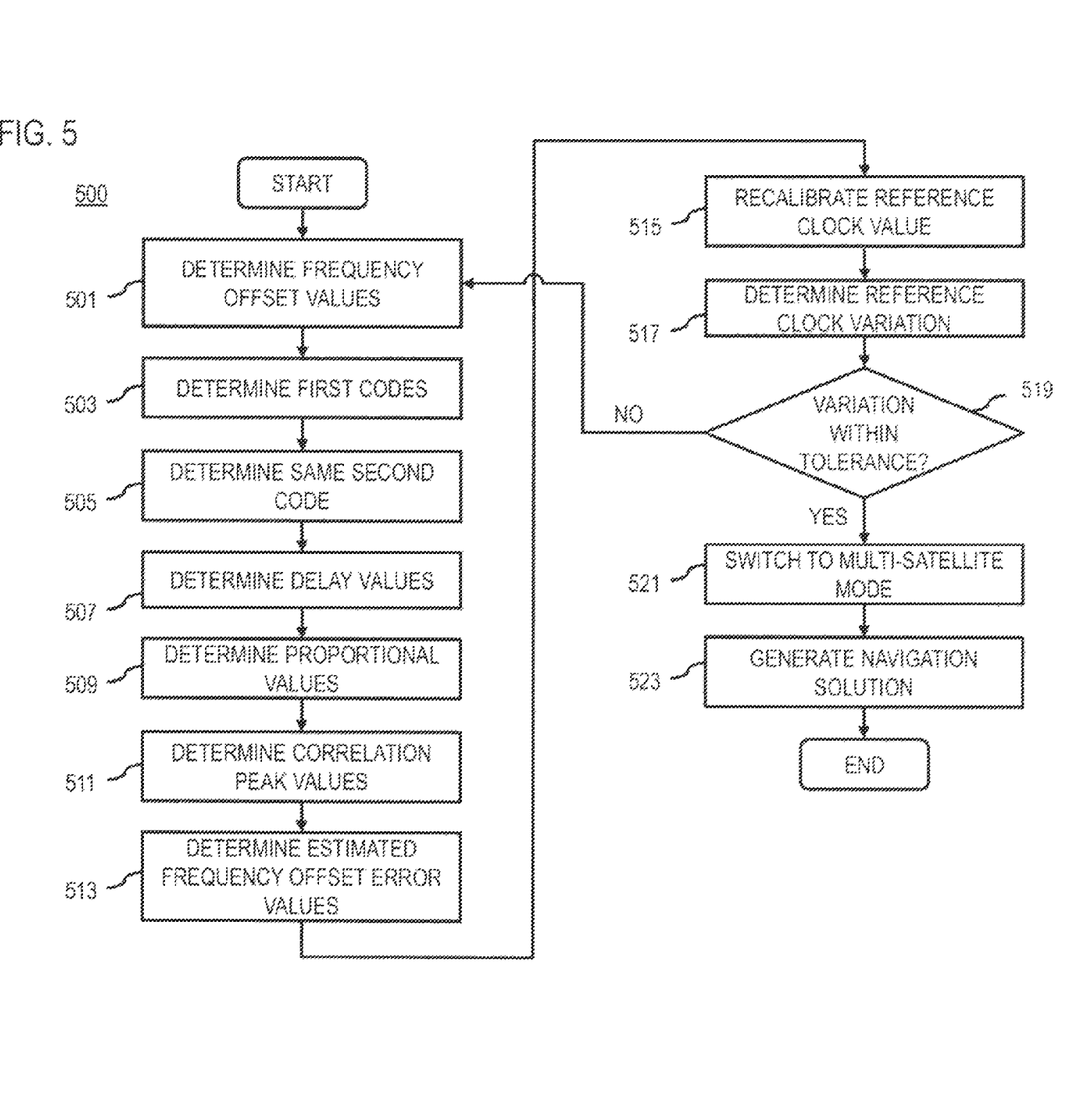
FIG. 5 is a flowchart of a process for correcting a reference clock by performing a coarse estimation of frequency offset during a GPS acquisition period, according to one embodiment.
Figure 6:
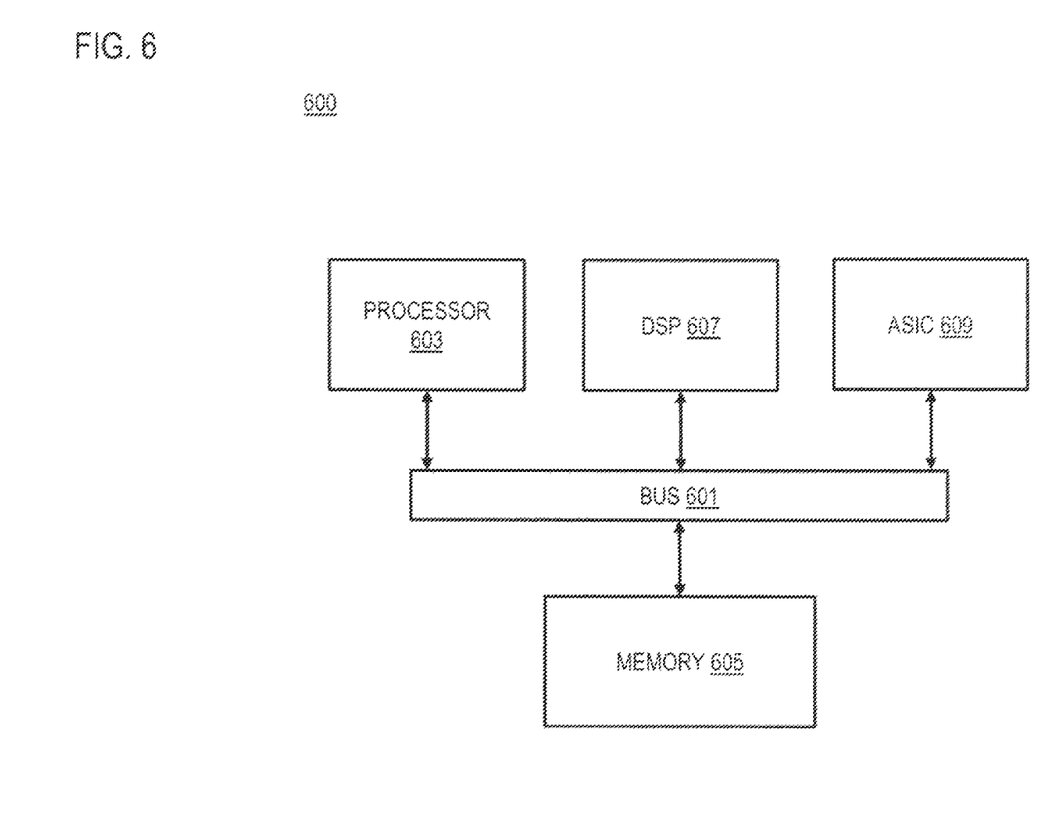
FIG. 6 is a diagram of a chip set that can be used to implement an embodiment.

FIG. 5 is a flowchart of a process for correcting a reference clock frequency by performing a coarse estimation of frequency offset during a GPS acquisition period, according to one embodiment. In one embodiment, the parallel code detector module 111 performs the process 500 and is implemented in, for instance, either the GPS baseband IC 103 or a chip set including a processor and a memory as shown in FIG. 6. In step 501, the parallel code detector module 111 determines one or more frequency offset values by causing, at least in part, one or more programmable frequency mixers 201 to be tuned to the one or more respective multiples of one or more respective frequency offset values. Then, in step 503, the parallel code detector module 111 determines one or more first codes associated with one or more satellites 109 by determining the one or more first codes associated with one or more respective satellites 109 by way of one or more code detector blocks 205 operating in a multi-satellite mode such that each of the one or more code detector blocks 205 is configured to process a different first code for each of the one or more satellites 109, the one or more code detector blocks 205 being respectively associated with the one or more programmable frequency mixers 201.

As discussed above, in one or more embodiments, the one or more programmable frequency mixers 201 comprise N programmable frequency mixers 201, the frequency offset equals $\Delta f$, and the one or more respective multiples of one or more respective frequency offset values equals $N \times \Delta f$. Additionally, the N programmable frequency mixers 201 may comprise $\pm N$ programmable frequency mixers 201.

Next, in step 505, the parallel code detector module 111 determines a same second code associated with the one or more satellites 109. For example, the second code that is used by the parallel code detector module 111 is set to be the same for all of the code detector blocks 205 for at least one of the satellites 109. The one or more code detector blocks 205 may optionally be reconfigured to operate in a single-satellite mode such that each of the one or more code detector blocks 205 is configured to process the same second code for one of the one or more satellites 109. As discussed above, this process may be repeated for each of the satellites 109 individually thereby correcting the reference clock frequency value based on each of the one or more satellites 109 to further tune the reference clock for minimal offset error. For example, if the system 100 comprises satellites, 109a, 109b, 109c and 109d. The code detector module 111 may communicate with all of the satellites 109 in the multi-satellite mode, and each code detector block 205 may be configured to use a different code associated with each of the satellites 109. But, when reconfigured, for example, to operate in the single-satellite mode to correct the reference clock frequency value for satellite 109a, each of the code detector blocks 205 are set to use a same code (which may be different from all of the initial codes used, or equal to at least one of the initial codes) for the satellite 109a. This process, among those discussed below, may be repeated for each of satellites 109b, 109c and 109d when correcting the reference clock frequency value such that the reference clock frequency value is based on each satellite 109 thereby enabling the output of an accurate navigation solution with minimal offset error.

The process continues to step 507 in which the parallel code detector module 111 determines one or more delay values between the same second code and the one or more first codes.

Next, in step 509, the parallel code detector module 111 determines one or more proportional values based, at least in part, on the one or more delay values and a determined correlation between the one or more frequency offset values and the same second code. The one or more code detector blocks 205 correlates the same second code with the one or more respective multiples of the one or more respective frequency offset values received by the one or more code detectors from its respective programmable frequency mixer 201. In one or more embodiments, the one or more code detector blocks 205 output the one or more respective proportional values based, at least in part, on the correlation between the same second code and the one or more respective multiples of the one or more respective frequency offset values.

Then, in step 511, the parallel code detector module 111 determines one or more correlation peak values based, at least in part, on the one or more respective proportional values and the one or more delay values. The process continues to step 513 in which the parallel code detector module 111 determines one or more estimated frequency offset error values based, at least in part, on the one or more correlation peak values.

The parallel code detector module 111 may determine one or more correlation peak values associated with one or more $+N \times \Delta f$ values and one or more corresponding correlation peak values associated with one or more $-N \times \Delta f$ values, the correspondence between the $+N \times \Delta f$ values and the $-N \times \Delta f$ values being based, at least in part, on a determined absolute value of the $+N$ value and the $-N$ value and a determination that the absolute value of the $+N$ value and the $-N$ value are equal. Further, the parallel code detector module 111 may determine one or more difference values between the one or more correlation peak values associated with the one or more $+N \times \Delta f$ values and the one or more corresponding correlation peak values associated with the one or more $-N \times \Delta f$ values. In one or more embodiments, the one or more estimated frequency offset error values are determined by adding the one or more difference values between the corresponding $\pm N \times \Delta f$ values.

Then, in step 515, the parallel code detector module 111 causes, at least in part, a calibrated reference clock frequency value associated with the reference clock module 131 discussed above to be changed to a recalibrated reference clock frequency value based, at least in part, on the one or more estimated frequency offset error values.

In one or more embodiments, the parallel code detector module 111 processes the one or more estimated frequency offset values to cause, at least in part, a control signal to be generated. The calibrated reference clock frequency value is accordingly changed to the recalibrated reference clock frequency value based on the control signal.

The process continues to step 517 in which the parallel code detector module 111 determines a variation between the recalibrated reference clock frequency value and the calibrated reference clock frequency value. Then, in step 519, the parallel code detector module 111 determines whether the variation between the recalibrated reference clock frequency value is within a predetermined tolerance. Next, in step 521, if the parallel code detector module 111 determines the variation is within the predetermined tolerance, the parallel code detector module 111 causes, at least in part, the one or more code detectors to be switched from the single-satellite mode to the multi-satellite mode to receive data from the one or more satellites. Then, in step 523, the parallel code detector module 111 processes the recalibrated reference clock frequency value to cause, at least in part, a navigation solution to be generated based, at least in part, on the recalibrated reference clock frequency value and the data received by the one or more satellites.

Alternatively, if the parallel code detector module 111 determines the variation between the recalibrated reference clock frequency value is outside a predetermined tolerance, the process returns to step 501 and repeats such that the parallel code detector module 111 causes, at least in part, the recalibrated reference clock frequency value to be continually recalibrated until the recalibrated reference clock frequency value is within the predetermined tolerance such that the recalibrated reference clock frequency value is a stabilized recalibrated reference clock frequency value.

The processes described herein for correcting a reference clock frequency by performing a coarse estimation of frequency offset during a GPS acquisition period may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 6 illustrates a chip set or chip 600 upon which an embodiment may be implemented. Chip set 600 is programmed to correct a reference clock frequency by performing a coarse estimation of frequency offset during a GPS acquisition period as described herein may include, for example, bus 601, processor 603, memory 605, DSP 607 and ASIC 609 components.

The processor 603 and memory 605 may be incorporated in one or more physical packages (e.g., chips). By way of example, a physical package includes an arrangement of one or more materials, components, and/or wires on a structural assembly (e.g. a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of correcting a reference clock frequency by performing a coarse estimation of frequency offset during a GPS acquisition period.

In one or more embodiments, the chip set or chip 600 includes a communication mechanism such as bus 601 for passing information among the components of the chip set 600. Processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 603 performs a set of operations on information as specified by computer program code related to correcting a reference clock by performing a coarse estimation of frequency offset during a GPS acquisition period. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 601 and placing information on the bus 601. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 603, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 603 and accompanying components have connectivity to the memory 605 via the bus 601. The memory 605 may include one or more of dynamic memory (e.g., RAM, magnetic disk, writable optical disk, etc.) and static memory (e.g., ROM, CD-ROM, etc.) for storing executable instructions that when executed perform the inventive steps described herein to correct a reference clock by performing a coarse estimation of frequency offset during a GPS acquisition period. The memory 605 also stores the data associated with or generated by the execution of the inventive steps.

In one or more embodiments, the memory 605, such as a random access memory (RAM) or any other dynamic storage device, stores information including processor instructions for correcting a reference clock by performing a coarse estimation of frequency offset during a GPS acquisition period. Dynamic memory allows information stored therein to be changed by system 100. RAM allows a unit of information stored at a location called a memory address to be stored and retrieved independently of information at neighboring addresses. The memory 605 is also used by the processor 603 to store temporary values during execution of processor instructions. The memory 605 may also be a read only memory (ROM) or any other static storage device coupled to the bus 601 for storing static information, including instructions, that is not changed by the system 100. Some memory is composed of volatile storage that loses the information stored thereon when power is lost. The memory 605 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 603, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the embodiments are not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:

1. A method comprising:
   determining one or more frequency offset values;
   determining one or more first codes associated with one or more satellites; determining a same second code associated with the one or more satellites; determining one or more delay values between the same second code and the one or more first codes;
   determining one or more proportional values based, at least in part, on the one or more delay values and a determined correlation between the one or more frequency offset values and the same second code;
   determining one or more correlation peak values based, at least in part, on the one or more respective proportional values and the one or more delay values;
   determining one or more estimated frequency offset error values based, at least in part, on the one or more correlation peak values; and
   causing, at least in part, a calibrated reference clock frequency value to be changed to a recalibrated reference clock frequency value based, at least in part, on the one or more estimated frequency offset error values.

2. A method of claim 1, further comprising:
   causing, at least in part, one or more programmable frequency mixers to be tuned to one or more respective multiples of the one or more respective frequency offset values;
   determining the one or more first codes associated with one or more respective satellites by way of one or more code detectors operating in a multi-satellite mode such that each of the one or more code detectors is configured to process a different first code for each of the one or more satellites, the one or more code detectors being respectively associated with the one or more programmable frequency mixers;
   causing, at least in part, the one or more code detectors to be reconfigured to operate in a single-satellite mode such that each of the one or more code detectors is configured to process the same second code for each of the one or more satellites;
   causing, at least in part, the one or more code detectors to correlate the same second code with the one or more respective multiples of the one or more respective frequency offset values received by the one or more code detectors from its respective programmable frequency mixer; and
   causing, at least in part, the one or more code detectors to output one or more respective proportional values based, at least in part, on the correlation between the same second code and the one or more respective multiples of the one or more respective frequency offset values.

3. A method of claim 2, further comprising:
   determining a variation between the recalibrated reference clock frequency value and the calibrated reference clock frequency value;
   determining the variation between the recalibrated reference clock frequency value is within a predetermined tolerance;
   causing, at least in part, the one or more code detectors to be switched from the single-satellite mode to the multi-satellite mode to receive data from the one or more satellites; and
   processing the recalibrated reference clock frequency value to cause, at least in part, a navigation solution to be generated based, at least in part, on the recalibrated reference clock frequency value and the data received by the one or more satellites.

4. A method of claim 2, further comprising:
   determining a variation between the recalibrated reference clock frequency value and the calibrated reference clock frequency value;
   determining the variation between the recalibrated reference clock frequency value is outside a predetermined tolerance;
   causing, at least in part, the recalibrated reference clock frequency value to be continually recalibrated until the recalibrated reference clock frequency value is within the predetermined tolerance such that the recalibrated reference dock frequency value is a stabilized recalibrated reference dock frequency value;
   causing, at least in part, the one or more code detectors to be switched from the single-satellite mode to the multi-satellite mode to receive data from the one or more satellites; and
   processing the stabilized recalibrated reference clock frequency value to cause, at least in part, a navigation solution to be generated based, at least in part, on the stabilized recalibrated reference clock frequency value and the data received by the one or more satellites.

5. A method of claim 2, wherein the one or more programmable frequency mixers comprise N programmable frequency mixers, the frequency offset equals $\Delta f$, and the one or more respective multiples of one or more respective frequency offset values equals $N \times \Delta f$.

6. A method of claim 5, wherein the N programmable frequency mixers comprise ±N programmable frequency mixers, the method further comprising:
  determining one or more correlation peak values associated with one or more +N×Δf values and one or more corresponding correlation peak values associated with one or more −N×Δf values, the correspondence between the +N×Δf values and the −N×Δf values being based, at least in part, on a determined absolute value of the +N value and the −N value and a determination that the absolute value of the +N value and the −N value are equal; and
  determining one or more difference values between the one or more correlation peak values associated with the one or more +N×Δf values and the one or more corresponding correlation peak values associated with the one or more −N×Δf values, wherein the one or more estimated frequency offset error values are determined by adding the one or more difference values between the corresponding +N×Δf values.

7. A method of claim 6, further comprising:
  processing the one or more estimated frequency offset values to cause, at least in part, a control signal to be generated, wherein the calibrated reference clock frequency value is changed to the recalibrated reference clock frequency value based on the control signal.

8. An apparatus comprising:
  at least one processor; and
  at least one memory including computer program code for one or more programs,
  the at least one memory and the computer program code configured to, with the at least one processor, cause the apparatus to perform at least the following, determine one or more frequency offset values;
  determine one or more first codes associated with one or more satellites;
  determine a same second code associated with the one or more satellites;
  determine one or more delay values between the same second code and the one or more first codes;
  determine one or more proportional values based, at least in part, on the one or more delay values and a determined correlation between the one or more frequency offset values and the same second code;
  determine one or more correlation peak values based, at least in part, on the one or more respective proportional values and the one or more delay values;
  determine one or more estimated frequency offset error values based, at least in part, on the one or more correlation peak values; and
  cause, at least in part, a calibrated reference clock frequency value to be changed to a recalibrated reference clock frequency value based, at least in part, on the one or more estimated frequency offset error values.

9. An apparatus of claim 8, wherein the apparatus is further caused to:
  cause, at least in part, one or more programmable frequency mixers to be tuned to one or more respective multiples of the one or more respective frequency offset values;
  determine the one or more first codes associated with one or more respective satellites by way of one or more code detectors operating in a multi-satellite mode such that each of the one or more code detectors is configured to process a different first code for each of the one or more satellites, the one or more code detectors being respectively associated with the one or more programmable frequency mixers;
  cause, at least in part, the one or more code detectors to be reconfigured to operate in a single-satellite mode such that each of the one or more code detectors is configured to process the same second code for each of the one or more satellites; cause, at least in part, the one or more code detectors to correlate the same second code with the one or more respective multiples of the one or more respective frequency offset values received by the one or more code detectors from its respective programmable frequency mixer; and
  cause, at least in part, the one or more code detectors to output one or more respective proportional values based, at least in part, on the correlation between the same second code and the one or more respective multiples of the one or more respective frequency offset values.

10. An apparatus of claim 9, wherein the apparatus is further caused to:
  determine a variation between the recalibrated reference clock frequency value and the calibrated reference clock frequency value;
  determine the variation between the recalibrated reference clock frequency value is within a predetermined tolerance;
  cause, at least in part, the one or more code detectors to be switched from the single-satellite mode to the multi-satellite mode to receive data from the one or more satellites; and
  process the recalibrated reference dock frequency value to cause, at least in part, a navigation solution to be generated based, at least in part, on the recalibrated reference clock frequency value and the data received by the one or more satellites.

11. An apparatus of claim 9, wherein the apparatus is further caused to:
  determine a variation between the recalibrated reference clock frequency value and the calibrated reference clock frequency value;
  determine the variation between the recalibrated reference clock frequency value is outside a predetermined tolerance;
  cause, at least in part, the recalibrated reference clock frequency value to be continually recalibrated until the recalibrated reference clock frequency value is within the predetermined tolerance such that the recalibrated reference clock frequency value is a stabilized recalibrated reference clock frequency value;
  cause, at least in part, the one or more code detectors to be switched from the single-satellite mode to the multi-satellite mode to receive data from the one or more satellites; and
  process the stabilized recalibrated reference clock frequency value to cause, at least in part, a navigation solution to be generated based, at least in part, on the estabilized recalibrated reference clock frequency value and the data received by the one or more satellites.

12. An apparatus of claim 9, wherein the one or more programmable frequency mixers comprise N programmable frequency mixers, the frequency offset equals Δf, and the one or respective multiples of one or more respective frequency offset values equals N×Δf.

13. An apparatus of claim 12, wherein the N programmable frequency mixers comprise ±N programmable frequency mixers, and the apparatus is further caused to:

determine one or more correlation peak values associated with one or more +N×Δf values and one or more corresponding correlation peak values associated with one or more −N×Δf values, the correspondence between the +N×Δf values and the −N×Δf values being based, at least in part, on a determined absolute value of the +N value and the −N value and a determination that the absolute value of the +N value and the −N value are equal; and determine one or more difference values between the one or more correlation peak values associated with the one or more +N×Δf values and the one or more corresponding correlation peak values associated with the one or more −N×Δf values, wherein the one or more estimated frequency offset error values are determined by adding the one or more difference values between the corresponding +N×Δf values.

14. An apparatus of claim 13, wherein the apparatus is further caused to:

processing the one or more estimated frequency offset values to cause, at least in part, a control signal to be generated, wherein the calibrated reference clock frequency value is changed to the recalibrated reference clock frequency value based on the control signal.

15. A non-transitory computer-readable storage medium carrying one or more sequences of one or more instructions which, when executed by one or more processors, cause an apparatus to at least perform the following:

determine one or more frequency offset values;

determine one or more first codes associated with one or more satellites;

determine a same second code associated with the one or more satellites;

determine one or more delay values between the same second code and the one or more first codes;

determine one or more proportional values based, at least in part, on the one or more delay values and a determined correlation between the one or more frequency offset values and the same second code;

determine one or more correlation peak values based, at least in part, on the one or more respective proportional values and the one or more delay values;

determine one or more estimated frequency offset error values based, at least in part, on the one or more correlation peak values; and cause, at least in part, a calibrated reference clock frequency value to be changed to a recalibrated reference clock frequency value based, at least in part, on the one or more estimated frequency offset error values.

16. A non-transitory computer readable storage medium of claim 15, wherein the apparatus is further caused to:

cause, at least in part, one or more programmable frequency mixers to be tuned to one or more respective multiples of the one or more respective frequency offset values;

determine the one or more first codes associated with one or more respective satellites by way of one or more code detectors operating in a multi-satellite mode such that each of the one or more code detectors is configured to process a different first code for each of the one or more satellites, the one or more code detectors being respectively associated with the one or more programmable frequency mixers;

cause, at least in part, the one or more code detectors to be reconfigured to operate in a single-satellite mode such that each of the one or more code detectors is configured to process the same second code for each of the one or more satellites;

cause, at least in part, the one or more code detectors to correlate the same second code with the one or more respective multiples of the one or more respective frequency offset values received by the one or more code detectors from its respective programmable frequency mixer; and cause, at least in part, the one or more code detectors to output one or more respective proportional values based, at least in part, on the correlation between the same second code and the one or more respective multiples of the one or more respective frequency offset values.

17. A non-transitory computer readable storage medium of claim 16, wherein the apparatus is further caused to:

determine a variation between the recalibrated reference clock frequency value and the calibrated reference clock frequency value;

determine the variation between the recalibrated reference clock frequency value is within a predetermined tolerance;

cause, at least in part, the one or more code detectors to be switched from the single-satellite mode to the multi-satellite mode to receive data from the one or more satellites; and process the recalibrated reference dock frequency value to cause, at least in part, a navigation solution to be generated based, at least in part, on the recalibrated reference clock frequency value and the data received by the one or more satellites.

18. A non-transitory computer readable storage medium of claim 16, wherein the apparatus is further caused to:

determine a variation between the recalibrated reference clock frequency value and the calibrated reference clock frequency value;

determine the variation between the recalibrated reference clock frequency value is outside a predetermined tolerance;

cause, at least in part, the recalibrated reference clock frequency value to be continually recalibrated until the recalibrated reference clock frequency value is within the predetermined tolerance such that the recalibrated reference clock frequency value is a stabilized recalibrated reference clock frequency value;

cause, at least in part, the one or more code detectors to be switched from the single-satellite mode to the multi-satellite mode to receive data from the one or more satellites; and process the stabilized recalibrated reference clock frequency value to cause, at least in part, a navigation solution to be generated based, at least in part, on the stabilized recalibrated reference clock frequency value and the data received by the one or more satellites.

19. A non-transitory computer readable storage medium of claim 16, wherein the one or more programmable frequency mixers comprise N programmable frequency mixers, the frequency offset equals Δf, and the one or more respective multiples of one or more respective frequency offset values equals N×Δf.

20. A non-transitory computer readable storage medium of claim 19, wherein the N programmable frequency mixers comprise ±N programmable frequency mixers, and the apparatus is further caused to:

determine one or more correlation peak values associated with one or more +N×Δf values and one or more corresponding correlation peak values associated with one or more $-N\times\Delta f$ values, the correspondence between the $+N\times\Delta f$ values and the $-N\times\Delta f$ values being based, at least in part, on a determined absolute value of the $+N$ value and the $-N$ value and a determination that the absolute value of the $+N$ value and the $-N$ value are equal; and determine one or more difference values between the one or more correlation peak values associated with the one or more $+N\times\Delta f$ values and the one or more corresponding correlation peak values associated with the one or more $-N\times\Delta f$ values, wherein the one or more estimated frequency offset error values are determined by adding the one or more difference values between the corresponding $+N\times\Delta f$ values.

* * * * *